(No Model.)

L. E. A. DUMONT.
METAL CHARM OR ORNAMENT.

No. 471,235. Patented Mar. 22, 1892.

WITNESSES:
William Goebel
Geo. H. Heides

INVENTOR
Louis E. A. Dumont
BY George Cook
ATTORNEY.

UNITED STATES PATENT OFFICE.

LOUIS E. A. DUMONT, OF NEWARK, NEW JERSEY.

METAL CHARM OR ORNAMENT.

SPECIFICATION forming part of Letters Patent No. 471,235, dated March 22, 1892.

Application filed January 9, 1892. Serial No. 417,463. (No model.)

*To all whom it may concern:*

Be it known that I, LOUIS E. A. DUMONT, a citizen of the United States, and a resident of Newark, in the county of Essex and State of New Jersey, have invented certain new and useful Improvements in Metal Charms or Ornaments, of which the following is a specification.

My invention relates to an improvement in metal articles constructed to represent animals, such as bulls, pigs, &c. Heretofore articles of this character have been constructed of two parts soldered together at their edges to form the completed animal. This method, however, is expensive in that it requires a great deal of time and skilled labor to have the edges nicely fitted together, and, furthermore, the completed article is more or less imperfect by reason of the difficulty of fitting said edges, which are necessarily very thin.

The purpose of my invention is to overcome these objections and to construct the article in closer imitation of the animal represented thereby and in a manner which shall be quicker and more economical than that above referred to.

With these and other ends in view my invention consists in certain novel features of construction, as will hereinafter be fully described, and pointed out in the claims.

Figure 1:
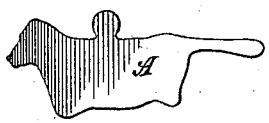
Figure 2:
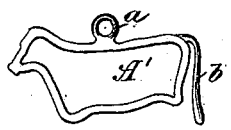
Figure 3:
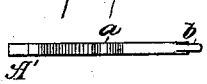
Figure 4:
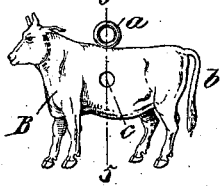
Figure 5:
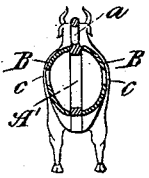

In the accompanying drawings, Figure 1 represents a blank from which the central section of the animal is formed. Fig. 2 is a side view of the central section of the animal. Fig. 3 is an edge view of the same. Fig. 4 is a side view of the completed article; and Fig. 5 is a sectional view taken on the line 5 5 of Fig. 4, looking toward the head of the animal.

In the drawings I have illustrated, and in the specification I have described, my invention as applied to a small article, such as may be used for a watch-charm; but I would have it understood that I do not limit my invention to such application, as larger articles, such as are used on the tops of clocks, mantel ornamentations, &c., may also be constructed in this manner. I have also shown in the drawings the representation of a bull; but of course it will be understood that my invention may be applied to other forms and shapes, such as that of the horse, pig, sheep, &c.

In constructing an article of this kind in accordance with my invention I first stamp or strike up by means of suitable dies the two sides B of the animal in a manner as heretofore. I then form a blank A, as shown in Fig. 1 of the drawings, preferably of thin metal, and by means of a suitable tool cut out the central portion thereof, as shown in Fig. 2, thus forming a central skeleton section A' in outline similar to that of the animal. At the same time the edges of the ring $a$, formed on the upper side thereof, and the tail $b$, formed on the rear end, are rounded. This central section A' is then inserted between the edges of the two outer sections B of the article and the whole soldered together. By inserting this central section all the trouble experienced in fitting the two thin edges of the metal together is overcome, and, further, the legs of the animal are thus separated and the article given a more natural appearance, and by constructing the article in this way it will be noticed that the tail may be formed on the central section and thus entirely separated from the two sides of the article, thus further adding to the natural appearance thereof.

If desired, the ring or loop $a$ may be omitted from the central section, which will of course be done in case the animal is made large, to serve, for instance, as a mantel ornament.

Again, it is not absolutely necessary that the blank shown in Fig. 1 should be cut in skeleton form, as shown in Fig. 2; but in the case of watch-charms or other small articles I prefer to form it in this way in order to render the article as light as possible.

If desired, a hole or opening may be formed in the side of the article, as shown at $c$, for the purpose of inserting a microscopical view therein, as is common in the case of watch-charms.

Having fully described my invention, what I claim as new, and desire to secure by Letters Patent, is—

1. A metal article constructed with two sides stamped or pressed into the form of an animal and having secured between them a central section of the contour of the animal represented and formed with a comparatively wide bearing-surface, to which the edges of said sides are secured, substantially as described.

2. A metal article made in imitation of an animal, constructed of two sides stamped or pressed into shape and a central section inserted between said sides and having the tail of the animal formed integral therewith, substantially as described.

3. An article made in imitation of an animal, constructed of two sides and a central section of the contour of the animal represented and inserted flatwise between the edges thereof, said section being constructed in skeleton form, substantially as described.

Signed at New York, in the county of New York and State of New York, this 7th day of January, A. D. 1892.

LOUIS E. A. DUMONT.

Witnesses:
GEORGE COOK,
GEO. F. HEIDET.